W. C. BAYLESS.
PLOW.
APPLICATION FILED FEB. 25, 1908.
899,021.
Patented Sept. 22, 1908.
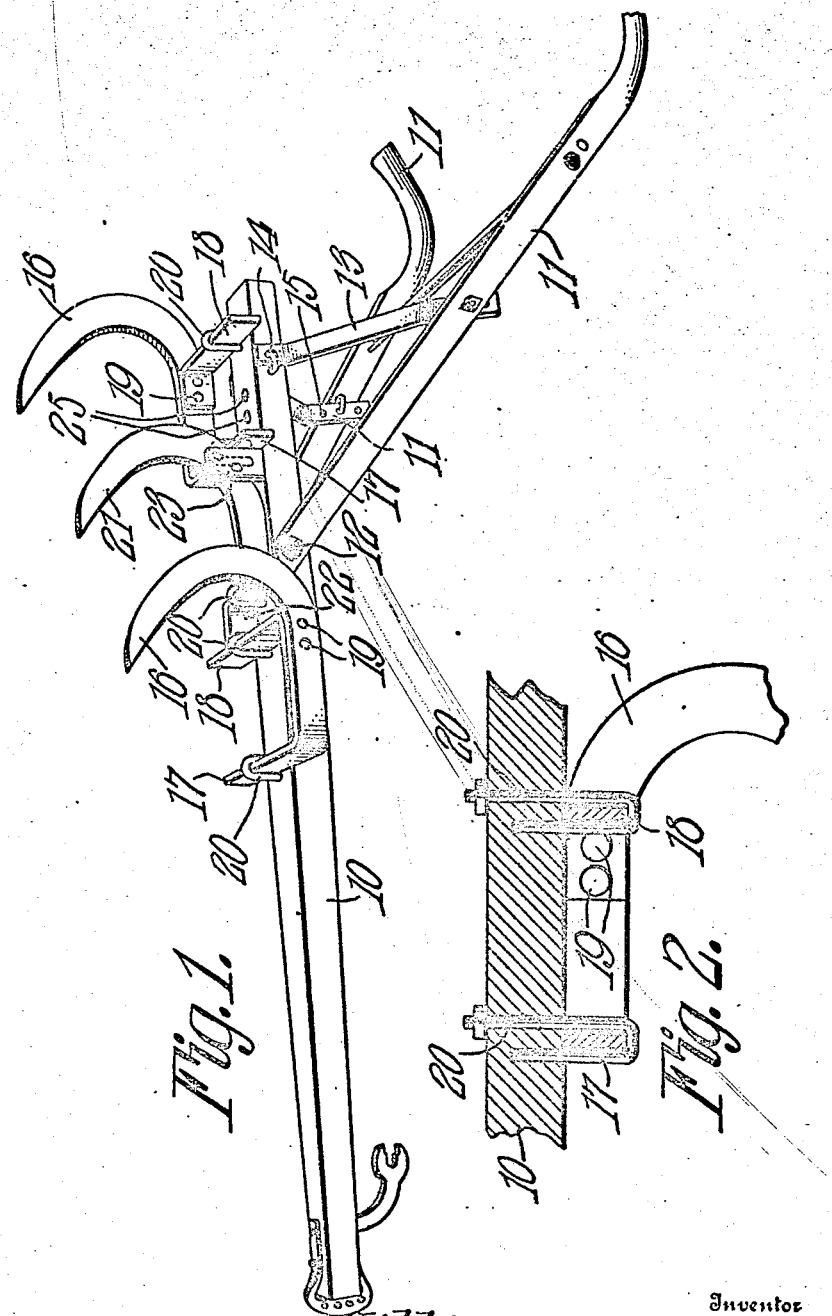
Witnesses
Inventor
William C. Bayless.
Attorneys
THE NORRIS PETERS CO., WASHINGTON, D. C.

UNITED STATES PATENT OFFICE.

WILLIAM CHARLES BAYLESS, OF JEFFERSON CITY, TENNESSEE.

PLOW.

No. 899,021.   Specification of Letters Patent.   Patented Sept. 22, 1908.

Application filed February 25, 1908. Serial No. 417,734.

*To all whom it may concern:*

Be it known that I, WILLIAM C. BAYLESS, a citizen of the United States, residing at Jefferson City, in the county of Jefferson and State of Tennessee, have invented a new and useful Plow, of which the following is a specification.

This invention relates to agricultural implements, and its object is to provide an improved form of plow.

More specifically, the invention relates to plows having a plurality of shares and standards therefor, and means by which one, two, three or more shares and standards can be used as found convenient.

The invention consists in certain novel forms of construction, combination of parts, and arrangements of details hereinafter fully set forth, shown in the drawings, and specifically claimed.

In the accompanying drawings:—Figure 1 is a view showing a plow equipped with this invention in an overturned position. Fig. 2 is a detail of the fastening bolts.

Similar numerals of reference are employed to indicate corresponding parts throughout the several figures of the drawings.

In the accompanying drawing, the numeral 10 indicates a plow beam, of wood, or it may be made of two iron or steel bars riveted together with iron lugs between, having holes in them for the U or hook bolts, hereinafter referred to, which is provided with handles 11 pivoted at 12, and an adjustable brace 13 is held to the beam, as at 14, and is connected through one of a series of holes 15 to the handle, as shown.

There is here shown a plow equipped with three standards, though it is evident that one standard alone may be used or as many as may be found convenient. The front and rear standards 16 are composed preferably of bar iron of rectangular section and have the forward ends 17 bent at right angles to the body to form an inwardly projecting arm. At 18 is formed a second inwardly projecting arm of approximately the same cross section and length. This arm may be riveted or otherwise secured as at 19 or may be formed, if desired, integral with the body 16. The front and rear standards 16 are each secured to the under side of the beam 10 by means of hook or U bolts 20, one bolt embracing the arm 17 of each standard and the other the arm 18, as shown.

As indicated in Fig. 2, the distance between the two sides of the U or hook bolts is slightly greater than the thickness of the arm which they embrace, and the sides of each U or hook bolt, together with its lower inside portion is rectangular, as shown. It will thus be seen that when the nuts of the U or hook bolts 20, 20 are loosened the lateral arms 17 and 18 can be easily moved so as to position the standards, 16 and 16, immediately under, close to or farther from the beam 10 and preferably on parallel lines with the beam 10, or, if desired, arranged angularly with reference to the beam.

With the short ends of the U hook bolts 20, 20 in the holes made for them, as shown in Fig. 2, it is clear that when the nuts of these bolts are tightened the short ends cannot spread or swerve from their positions, thus a strong and durable attachment is provided for holding the arms 17 and 18 of the standards 16, 16 to the beam 10. Moreover, when the nuts and threads of the U or hook bolts have rusted, as always happens to plow bolts, and hence are hard to loosen, these U or hook bolts cannot turn round in the holes as ordinary plow bolts do when an effort is made to loosen such rusty bolts. This advantage pertains to all the bolts in this plow which are preferably U or hook bolts.

Between the standards, 16, 16, is mounted a third standard 21 having the forward end thereof bent twice at right angles, as indicated at 22. A lug 23 is attached to said standard being here riveted thereto, or it may be integrally formed therewith at the rear end of the same. The distance between the forward end of the doubly bent portion 22 and the rear edge of the lug 23 is preferably the same as the distance between the rear arm 18 of the front standard 16 and the front arm 17 of the rear standard 16. As this third standard 21 is always mounted directly under the beam 10 one U or hook bolt clasping it between the two right angles 22 is sufficient to hold it firmly, the lug 23 acting as a brace against the beam 10. By moving rear standard 16 one position forward, third standard 21 can be mounted behind it at the position shown by two holes 25, in Fig. 1, made for that purpose.

This plow as shown in Fig. 1 is a three share and three standard cultivator. By detaching the front and rear standards 16, 16, and this can be readily done, we have left a one standard plow 21. This standard 21 can then be shifted to any one of the five U or hook bolts 20, back of where it now stands for deeper plowing or forward of where it now stands for shallow plowing. By detaching one of the standards 16 and also standard 21, the other standard 16 can be used as a single standard plow by positioning said standard 16 directly under the beam 10, and for deep or shallow plowing it can be placed in three positions, two of these positions are fixed by the two front and the two rear U or hook bolts respectively and the other or middle position is made up by the U or hook bolt that holds the lateral arm 17 of the rear standard and the U or hook bolt that holds the standard 21, both shown in Fig. 1.

By detaching standard 21, Fig. 1, we have left a two standard plow. If preferred, and it generally is, the rear standard may be moved forward by placing lateral arm 18 in the second U or hook bolt from the back end of beam 10, and passing lateral arm 17 under the U or hook bolt which holds standard 21 in Fig. 1. This positioning furnishes a smooth running double plow of great strength.

It will also be plain that when all three standards are used, the arrangement shown in Fig. 1 will lock the three firmly together and constitute a continuous structure beneath the beam.

What is claimed is:—

1. In a plow, a beam, a standard having two parallel portions extending longitudinally beneath the beam, and a transverse portion connecting the same, and a single hook bolt engaging the transverse portion of and securing said standard to said beam.

2. In a plow, a beam, a front standard provided with arms extending laterally beneath the beam, a second standard held longitudinally beneath the beam and in contact with an arm of the first standard, and means to secure said standards to said beam.

3. In a plow, a beam, a standard provided with arms extending laterally beneath the beam, a hook bolt engaging each of said arms, a second standard having two parallel portions extending longitudinally beneath the beam and a transverse portion connecting the same, said standard being held in contact with the first standard, and a single hook bolt engaging the transverse portion of the second standard.

4. In a plow, a beam, a pair of spaced standards arranged on opposite sides of the beam each provided with a pair of lateral arms extending transversely beneath the beam, an intermediate standard arranged longitudinally beneath said beam and in contact with the adjacent arms of the pair of standards, and means to secure said standards to the beam in continuous braced relation.

5. In a plow, a beam, a pair of spaced standards arranged on opposite sides of said beam each provided with a pair of lateral arms extending transversely beneath said beam, a hook bolt engaging each of said arms, an intermediate standard arranged longitudinally beneath said beam and in contact with the adjacent arms of the said pair of standards, and a single hook bolt held to secure said intermediate standard to said beam, in continuous braced relation to the pair of standards.

6. In a plow, a beam, a pair of spaced standards arranged on opposite sides of said beam each provided with a pair of lateral arms extending transversely beneath said beam, a hook bolt engaging each of said arms, an intermediate standard having two parallel portions extending longitudinally beneath the beam and a transverse portion connecting the same, said standard being held in contact with the adjacent arms of said pair of standards, and a single hook bolt engaging the transverse portion of the last mentioned standard to secure the same to said beam in continuous braced relation to the pair of standards.

In testimony that I claim the foregoing as my own, I have hereto affixed my signature in the presence of two witnesses.

WILLIAM CHARLES BAYLESS.

Witnesses:
J. D. MURPHY,
W. A. EDGAR.